United States Patent
Jones et al.

[11] Patent Number: 5,948,456
[45] Date of Patent: Sep. 7, 1999

[54] METHOD AND APPARATUS FOR MOLDING A FOOD PRODUCT

[75] Inventors: Sean T. Jones, Pamber Heath; Jeremy P. Miller, Mortimer, both of United Kingdom

[73] Assignee: Air Products and Chemicals, Inc., Allentown, Pa.

[21] Appl. No.: 08/919,050

[22] Filed: Aug. 27, 1997

[30] Foreign Application Priority Data

Aug. 30, 1996 [GB] United Kingdom .................... 9618171
May 13, 1997 [GB] United Kingdom .................... 9709725

[51] Int. Cl.⁶ ...................................................... A23G 9/00
[52] U.S. Cl. .......................... 426/100; 426/383; 426/389; 426/512; 426/524; 99/485
[58] Field of Search ..................................... 426/100, 101, 426/389, 512, 513, 515, 89, 383, 524; 425/385, 384

[56] References Cited

U.S. PATENT DOCUMENTS

| | | | |
|---|---|---|---|
| 3,360,384 | 12/1967 | Kurzinski et al. | 99/192 |
| 3,647,478 | 3/1972 | Minor et al. | 99/137 |
| 3,852,507 | 12/1974 | Toby | 426/513 |
| 4,413,461 | 11/1983 | Waldstrom | 53/122 |
| 4,648,829 | 3/1987 | Cattani | 425/326.1 |
| 4,761,128 | 8/1988 | Fowler et al. | 425/126.2 |
| 4,761,962 | 8/1988 | Andersson | 62/63 |
| 4,882,176 | 11/1989 | Koyama et al. | 426/5 |
| 4,914,927 | 4/1990 | Miller et al. | 62/381 |
| 5,199,269 | 4/1993 | Andersson | 62/63 |

FOREIGN PATENT DOCUMENTS

| | | | |
|---|---|---|---|
| 0589820 | 9/1993 | European Pat. Off. | A23G 1/21 |
| 0582327 | 9/1994 | European Pat. Off. | |
| 3527005 | 7/1985 | Germany . | |
| WO9006693 | 6/1990 | WIPO . | |
| 9624261 | 8/1996 | WIPO | A23P 1/10 |
| 9830111 | 7/1998 | WIPO | A23G 1/21 |

Primary Examiner—David Lacey
Assistant Examiner—Drew Becker
Attorney, Agent, or Firm—Robert J. Wolff

[57] ABSTRACT

In a method of forming a frozen food product, the temperature of a fluid food product is lowered so that the product is plastic. A mould is pressed against the food product to cause at least a portion of the product to take up the shape of the mould. The mould is at a sufficiently low temperature when it is pressed against the product such that the product retains its moulded shape and such that the product is readily releasable from the mould. This allows frozen confectionery products such as ice cream to be successfully moulded.

31 Claims, 5 Drawing Sheets

METHOD AND APPARATUS FOR MOLDING A FOOD PRODUCT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to a method and apparatus for moulding a food product.

There is a strong desire in the food industry to form moulded frozen food products. This is particularly the case with frozen confectionery products such as ice creams. The market for frozen confectionery products is very dependent on impulse purchases by consumers. Accordingly, it is important to be able to make the frozen confectionery product in as interesting, distinctive and aesthetically pleasing a shape as possible. It is generally desired to be able to mould any frozen food product, such as a frozen meat product. There is also a desire in the industry to be able to stamp a logo or other design in the surface of a frozen food product.

Ice creams, particularly ice cream stick confections, are presently always extruded, whether they are multi-coloured or layered, chocolate coated, or otherwise. Conventionally, ice cream has been extruded because of the lack of any moulding technology that can properly handle ice cream. This is because, in the prior art technology, adhesion between the frozen product and the mould surface has always caused severe problems. The adhesion causes a part of the product to be retained by the mould because the product-mould bond strength is often greater than the strength of the frozen product itself, causing the product to shear rather than the product-mould bond when the product is released from the mould. This adhesion has also prevented the stamping of frozen products such as ice cream with a stamp bearing a logo such as the manufacturer's trade mark or some other design.

To date, the only way to mould frozen confectionery products has been to allow the adhesive bond between the frozen product and the mould to form and then remove the bond by thawing a thin outer layer of the frozen product. This has the drawback that energy is wasted in warming up a portion of a product which has just been frozen only to have to freeze the product surface again. Energy is also wasted in repeatedly warming and cooling the mould. Furthermore, there is almost always a poor surface finish on the frozen product and often a portion of the product is retained by the mould. As products like ice creams are eaten uncooked, it is also undesirable to warm the product during manufacture because of potential hygiene problems and associated health risks caused by warming food during manufacture.

In our EP-A-0582327, there is disclosed a method of forming a water ice (or ice lolly) in which a mould is cooled to a temperature of preferably between −70° C. to −80° C. prior to pouring in the liquid solution for forming the water ice. It is understood that it is the rate of cooling of the surface of the liquid which causes low adhesion to the mould surface. However, that disclosure is only concerned with forming moulded frozen products which are liquid when they enter the mould. Moreover, the technique of that prior proposal cannot be used to impress a logo or other design in the surface of a frozen product.

In WO-A-90/06693, there is disclosed a method of freezing the surface of a product. A supporting structure for the product is cooled to a temperature which is low enough to avoid the product sticking to the supporting structure. The product is maintained in contact with the supporting structure for long enough for at least the surface layer of the product to freeze. By freezing the surface of a food product, it is stated that the product becomes easier to handle. It is stated that the product undergoes no deformation and has no impressions made in its surface. In one particular embodiment described in WO-A-90/06693, when the product is liquid or semi-liquid, the product can be received and contained by depressions in the supporting structure.

BRIEF SUMMARY OF THE INVENTION

The present invention is a method of moulding a food product comprising the steps of (i) lowering the temperature of a food product so that the product is "plastic" (ie is capable of being permanently deformed on application of force); and (ii) pressing a mould against the food product to cause at least a portion of the product to take up the shape of the mould, the mould being at a sufficiently low temperature when the mould is pressed against the product such that the product retains its moulded shape and such that the product is readily releasable from the mould. The present invention is especially suitable to confectionery food products such as ice cream.

DETAILED DESCRIPTION OF THE INVENTION

According to a first aspect of the present invention, there is provided a method of moulding a food product, the method comprising the steps of:

lowering the temperature of a food product so that the product is plastic; and, pressing a mould against the food product to cause at least a portion of the product to take up the shape of the mould, the mould being at a sufficiently low temperature when the mould is pressed against the product such that the product retains it moulded shape and such that the product is readily releasable from the mould.

"Plastic" is used herein to mean that the product will undergo plastic deformation, i.e. the product is mouldable and will retain its moulded shape after the deforming force is removed. In other words, a product which is plastic will be permanently deformed on application of force.

The food product may be a confectionery product, such as ice cream. The temperature of the ice cream is preferably lowered to −3° C., or −5° C., or −6° C. or lower such as −20° C. prior to placing the mould against the ice cream.

The confectionery product may be a sorbet.

The food product may be any product which is frozen and mouldable such as a meat product.

The moulding step may impress a pattern in a surface of the product. Alternatively, the moulding step may mould the bulk shape of the product.

The temperature of the product is preferably lowered to below 0° C. This upper limit is particularly applicable when the product is ice cream. For a non-ice cream product, such as a meat puree, a higher temperature may be used as the viscosity of the product may be high enough at such higher temperature.

The temperature of the mould is preferably such that the temperature of the product remains below 0° C. during the pressing step.

The temperature of the mould is preferably less than −40° C., more preferably less than −50° C., and more preferably less than −75° C. The temperature of the mould may be equal to or less than −80° C.

The temperature of at least a part of the mould may be held at −120° C. whilst the temperature of at least another part of the mould may be held in the range −100° C. to −80° C. In particular, where a mould comprises upper and lower mould parts, the product being supported in use on the lower mould part, the temperature of the lower mould part is preferably held at −120° C. and the temperature of the upper mould part is preferably held in the range −100° C. to −80° C.

The temperature of the mould can be maintained using liquid nitrogen. The temperature of the mould can be maintained by spraying a rear non-moulding surface of the mould with liquid nitrogen. A rear non-moulding surface of the mould may be immersed with liquid nitrogen. The mould may have through channels through which liquid nitrogen is passed.

The product may be in contact with the mould for 5 seconds. This may be appropriate where bulk moulding of the product is taking place.

The product may be in contact with the mould for 0.5 seconds. This may be appropriate where moulding with negligible hardening (i.e. cooling) or only "surface moulding" of the product is taking place.

A pressure of 0.5 bar at the product surface may be applied to the product during the moulding step.

Whilst in some circumstances, it may be desired to use the cold mould to achieve cooling of the product, further cooling of the product after moulding can be achieved in a separate cooling station. The product may be supported by at least a part of the mould in the cooling station.

Instead of or in addition to a cooling station, cryogenic pellets may be introduced into the product prior to the moulding step to cause the product to harden after the moulding step. A portion of the product may be removed prior to the moulding step, said portion may be cooled to a cryogenic temperature, and said portion may then be pelletized to form said cryogenic pellets.

In the preferred embodiments, because of the very low temperature of the mould, it is found that the product does not adhere to the mould. Accordingly, when the mould is lifted from the product, no product is retained by the mould and the surface integrity of the product is maintained. Because the moulding step can be so quick, if desired, the product is not cooled to any significant extent in the mould. In other words, the mould is only used to shape the product and is preferably not used to achieve any significant cooling of the product. Successful and accurate moulding of frozen confectionery products such as ice cream can be achieved. Nevertheless, in some circumstances, it may be desired to use the cold mould to achieve cooling of the product.

It will be appreciated that in the present invention, the mould is used to apply a positive pressure to the food product during the moulding step.

According to a second aspect of the present invention, there is provided apparatus for forming a moulded frozen food product, the apparatus comprising:

means for lowering the temperature of a food product so that the product is plastic;

a mould; and, pressing and cooling means for pressing the mould against the food product to cause at least a portion of the product to take up the shape of the mould and for maintaining the mould at a sufficiently low temperature when the mould is pressed against the product such that the product retains its moulded shape and such that the product is readily releasable from the mould.

The cooling means is preferably operable to maintain the temperature of the mould such that the temperature of the product remains below 0° C.

The temperature of the mould may be maintained at less than −40° C., preferably less than −50° C., and more preferably at less than −75° C. In a particular embodiment, the temperature of the mould is preferably maintained at a temperature equal to or less than −80° C.

In another embodiment, the temperature of at least a part of the mould may be held at −120° C. whilst the temperature of at least another part of the mould may be held in the range −100° C. to −80° C. In particular, where a mould comprises upper and lower mould parts, the product being supported in use on the lower mould part, the temperature of the lower mould part is preferably held at −120° C. and the temperature of the upper mould part is preferably held in the range −100° C. to −80° C.

The cooling means may comprise means for spraying a rear non-moulding surface of the mould with liquid nitrogen. The cooling means may comprise means for immersing a rear non-moulding surface of the mould with liquid nitrogen. The mould may have through channels for passage therethrough of liquid nitrogen.

The apparatus preferably includes temperature measuring means for monitoring the temperature of the mould, the output of the temperature measuring means being received by control means for controlling the cooling means thereby to control the temperature of the mould.

A conveyor for conveying a product to the mould may be provided. The conveyor can be continuously moving, the apparatus having means for moving the mould to track a product on the moving conveyor during moulding of a product. As an alternative, the conveyor may index (i.e. move in discrete steps) with the mould being stationary.

In a preferred embodiment, the mould has a first moulding part and a second moulding part, the first moulding part being movable relatively to the second moulding part so as to selectively open and close the mould. The second moulding part may comprise a mould cylinder and a moulding piston contained within and movable relatively to the mould cylinder such that the mould may be closed by bringing the first moulding part into contact with the mould cylinder of the second moulding part, the moulding piston of the second moulding part being movable towards the first moulding part to mould a product within the mould. This allows moulding to be achieved without producing "flash" moulding lines on the product.

Embodiments of the present invention will now be described with reference to the accompanying drawings.

Figure 1:
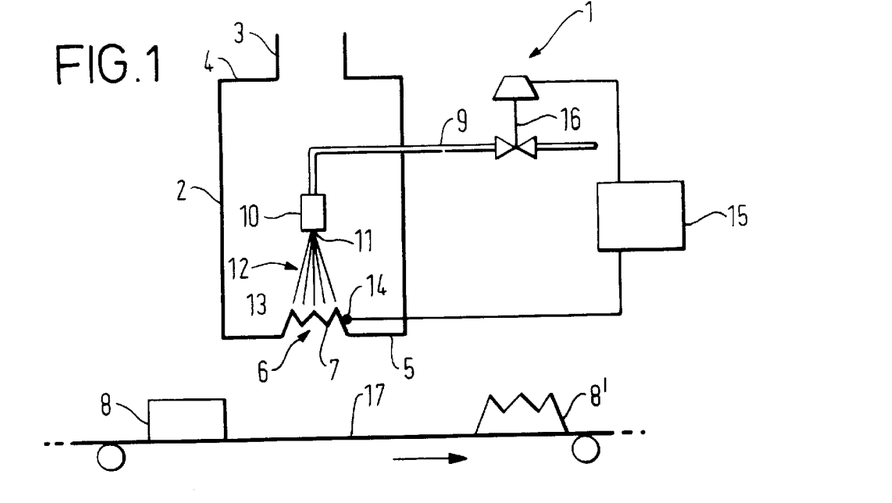
FIG. 1 is a schematic cross-sectional view of a first example of apparatus for and according to the present invention.

In FIG. 1, an example of apparatus 1 according to and for carrying out the invention includes a chamber 2. The chamber 2 has a chimney or vent 3 in its uppermost surface 4. In its lowermost surface 5, a mould 6 is fixed or formed. The mould 6 has a shaped surface 7 external of the chamber 2 which is the inverse of the desired shape for a product 8 to be moulded. In this example, the bulk shape of the product 8 is moulded.

An inlet pipe 9 conveys liquid nitrogen to a spray nozzle 10. The outlet 11 of the spray nozzle 10 directs the liquid nitrogen 12 to the rear or inner face 13 of the mould 6 in order to cool the mould 6.

A thermal probe such as a thermocouple 14 is in good thermal contact with the mould 6 so that the temperature of the mould 6 can be monitored. The output of the thermocouple 14 is supplied to an electronic control unit 15. The electronic control unit 15 sends control signals to a control valve 16 in the liquid nitrogen supply pipe 9. This allows the electronic control unit 15 to control the flow of liquid nitrogen through the pipe 9 to the mould 6 according to the detected temperature of the mould 6, thereby allowing the temperature of the mould 6 to be adjusted and maintained at a desired value.

The mould 6 may be made of stainless steel and is preferably less than 2 mm thick. If the mould is made of a material having a higher thermal conductivity, then the mould 6 may or should be made of thicker material.

The food product is usually one which is fluid at room temperature, for example ice cream or sorbet. The temperature of the fluid food product is reduced so that it is no longer fluid and becomes plastic. In particular, the food product may be frozen (or at least partially frozen or "semi-frozen") so that it has some solidity and is therefore mouldable. The food product might be a meat product consisting of processed meat and fillers which is cooled so as to be non-fluid and therefore mouldable.

Portions 8 of the non-fluid food product are then continuously transported on a conveyor 17. In a particular example, the product 8 may be portions of ice cream at a temperature of −5° C. or −6° C. At this temperature, the ice cream is substantially non-fluid and will undergo plastic deformation. The ice cream portions 8 are conveyed beneath the chamber 2 at a rate of eighty units per minute. The chamber 2 including the mould 6 is attached to a mechanical arm (not shown) which lowers the chamber 2, thereby pressing the mould 6 against the product 8. As the product 8 continues to move with the conveyor 17, the chamber 2 tracks the product 8 for a short while by movement of the mechanical arm. After for example 5 seconds have elapsed, the chamber 2 is lifted again by the mechanical arm to remove the mould 6 from the moulded or shaped product 8'. The chamber 2 is then returned to its original position so that it can be lowered over the next product 8 to be moulded or shaped.

Throughout the moulding step, the mould 6 is maintained at a temperature of −80° C. by control of the liquid nitrogen supply valve 16 by the electronic control unit 15 in accordance with output signals from the thermocouple 14. Because of the very low temperature of the mould 6, it is found that the product 8 does not adhere to the mould 6. Accordingly, when the mould 6 is lifted from the shaped product 8', no product is retained by the mould 6 and the surface integrity of the product 8' is maintained. Because the moulding step can be so quick, taking place in 5 seconds or less, the product 8 is not cooled to any significant extent in the mould 6. In other words, the mould 6 is only used to shape the product and is not used to achieve any significant cooling of the product 8. Nevertheless, it may be convenient in some circumstances to use the cold mould 6 to achieve cooling of the product 8 during the moulding step. This can be done by applying the mould 6 to the product 8 for a longer period than 5 seconds, for example.

Figures 2A, 2B, 3:
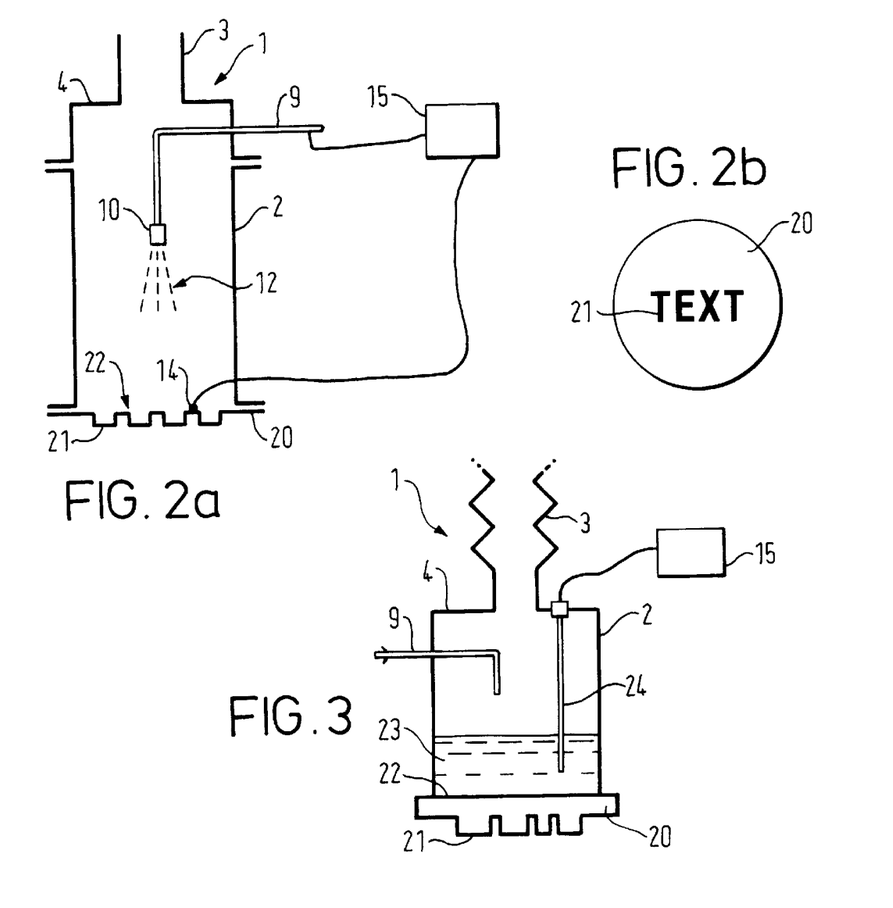
FIG. 2a is a schematic cross-sectional view of a second example of apparatus for and according to the present invention.
FIG. 2b is an underneath view of the apparatus of the second example.
FIG. 3 is a schematic cross-sectional view of a third example of apparatus for and according to the present invention.

A second example of the present invention is shown in FIGS. 2a and 2b. Individual features of the apparatus which correspond to the example shown in FIG. 1 are identified by the same reference numerals. In this example, the mould 20 is in the form of a stamp. The stamp 20 has raised portions 21 which correspond to the logo such as text or a design or a trade mark which is to be stamped into or onto the surface of a product 8. As in the example in FIG. 1, the rear surface 22 of the stamp 20 is cooled by a spray of liquid nitrogen 12. The temperature of the stamp 20 is monitored using a thermal probe 14, the output of which is sent to a control unit 15 which controls operation of a control valve 16 (not shown in FIG. 2a) for the liquid nitrogen supply pipe 9. The stamp 20 may be maintained at the same temperature as the mould 6 of the first example described above.

The temperature of the food product is lowered so that it is no longer fluid, i.e. such that the food product is plastic. Portions 8 of the non-fluid food product are passed by a conveyor 17 as in FIG. 1 under the stamp 20. The stamp 20 is pressed onto the top surface of the product 8 by wholesale movement downwards of the chamber 2. The stamp 20 may track the product 8 for a short period of time, such as 0.5 seconds, after which the chamber 2 is raised to withdraw the stamp 20 from the stamped product 8'. The chamber 2 and stamp 20 can then be returned to their initial position in order to be ready to stamp the next product 8 on the conveyor 17.

A third example of apparatus according to and for carrying out the invention is shown in FIG. 3. The apparatus of FIG. 3 is similar to the apparatus of FIG. 2 in that it is provided with a stamp 20 having raised portions 21 for stamping a logo or other design into or onto the surface of a product 8. Identical reference numerals are used to indicate parts which correspond to those of FIG. 2.

In the example shown in FIG. 3, the temperature of the stamp 20 is maintained at the desired level by immersing the rear surface 22 of the plate 20 in a bath of liquid nitrogen 23 maintained within the chamber 2. The depth or level of the liquid nitrogen 23 in the chamber 2 is constantly monitored by a level indicator 24. The output of the level indicator 24 is sent to a control unit 15 which is used to control the supply of liquid nitrogen from the supply pipe 9 in order to maintain the liquid nitrogen 23 in the chamber 2 at a constant level. As before, a control valve 16 (not shown) is provided in the supply line 9.

It will be appreciated that a liquid nitrogen bath 23 could be used in the example of FIG. 1 instead of spraying the rear 13 of the mould 6 with liquid nitrogen.

In FIGS. 4a to 4e, there is shown the detailed operation of a mould 30 of a further example of apparatus according to and for carrying out the present invention. The mould 30 has an upper part 31 and a lower part 32 in the drawings. The upper part 31 is internally formed with a moulding portion 33 to mould the upper portion of the product 8. The lower part 32 of the mould has a stationary ring-like mould wall or cylinder 34 and an internal moulding piston 35 which can move up and down in and relatively to the mould cylinder 34. The internal moulding piston 35 is shaped to mould the lower portion of the product 8. Pneumatic rams 36,37 are used to drive the upper part 31 of the mould 30 and the internal moulding piston 35 of the lower part 32 of the mould 30 respectively up and down in the drawings. Spray nozzles 10 are used to direct liquid nitrogen onto the rear non-moulding surfaces of the mould 30. The temperature of the mould 30 can be monitored and the spray of liquid nitrogen controlled as described for the other examples above.

Figure 4A:
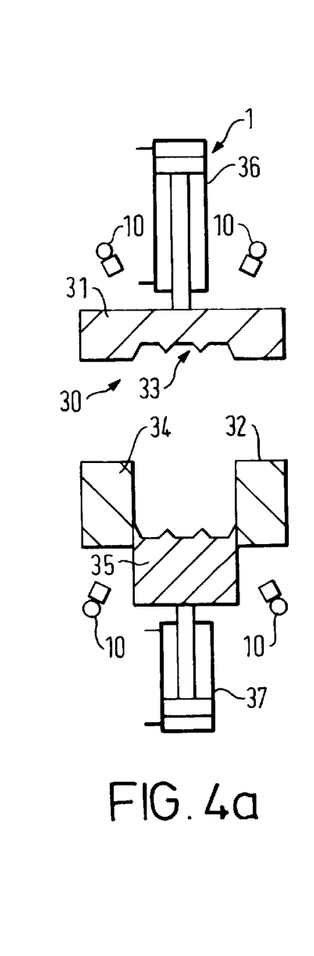
FIGS. 4a to 4e are schematic cross-sectional views showing operation of apparatus of a fourth example of the present invention.
Figure 4B:
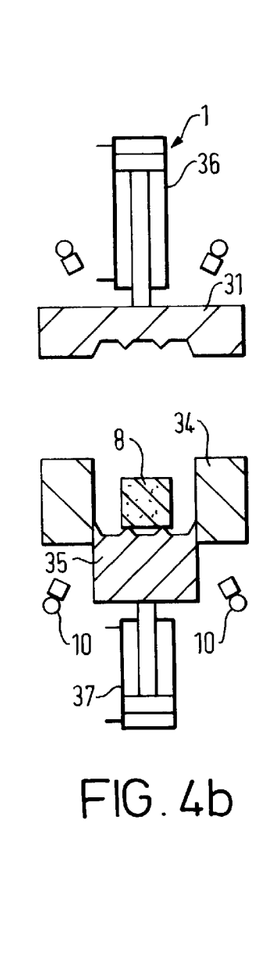

In operation, the upper part 31 and the lower moulding piston 35 are pulled apart by the drive rams 36,37 as shown in FIG. 4a. A portion of the product 8 is introduced between the moulding surfaces and may sit on the lower moulding piston 35 as shown in FIG. 4b.

Figure 4C:
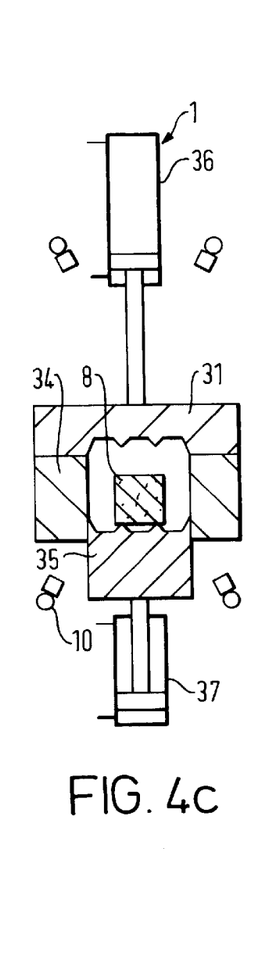
Figure 4D:
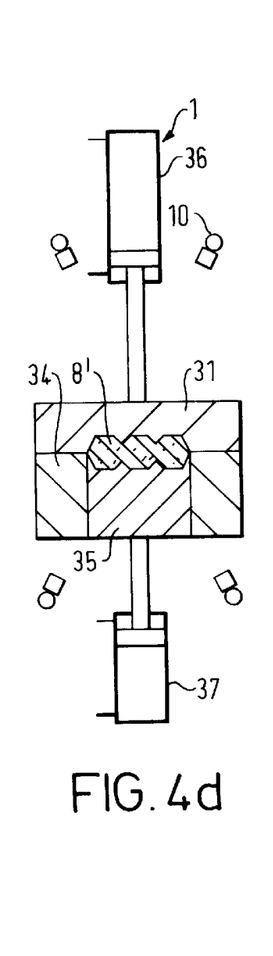

The upper part 31 of the mould 30 is then moved downwards to meet the upper surface of the mould cylinder 34 of the lower part 32 of the mould 30 as shown in FIG. 4c. This effectively closes the mould 30. The lower moulding piston 35 is then moved upwards by its drive ram 37 to squeeze the product 8 between the moulding surface 32 of the upper part 31 of the mould 30 and the lower molding piston 35. This causes the product 8' to be moulded and to take up the shape of the mould 30 as shown in FIG. 4d. The movement upwards of the lower moulding piston 35 can be controlled to be over a fixed distance or until a predetermined resistance pressure is detected by a suitable detector (not shown) associated with the mould 30 for example.

Figure 4E:
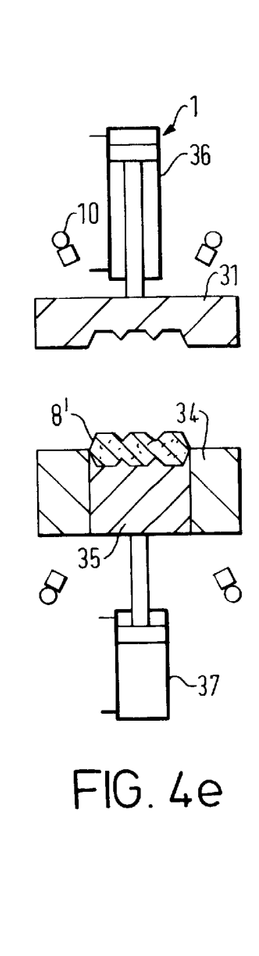

After a fixed period of for example 5 seconds or less has elapsed, the upper part 31 of the mould 30 is withdrawn as shown in FIG. 4e, thereby allowing the moulded product 8' to be removed. The lower moulding piston 35 is then lowered to the position shown in FIG. 4a and the mould 30 is ready for use again.

Because the mould 30 is closed before moulding takes place (as shown in FIG. 4c), "flash" moulding lines are not produced on the moulded product 8', leading to a better surface finish.

As shown in FIGS. 5a to 5j, which show apparatus 1 similar to the apparatus shown in FIGS. 4a to 4e, an opening or recess 38 may be provided in the cylinder 34 of the lower part 32 of the mould 30. This allows a wooden stick 39 to be inserted on completion of or during the actual moulding step (for example, in FIG. 5e) so as to produce an ice cream stick confection.

Figure 5A:
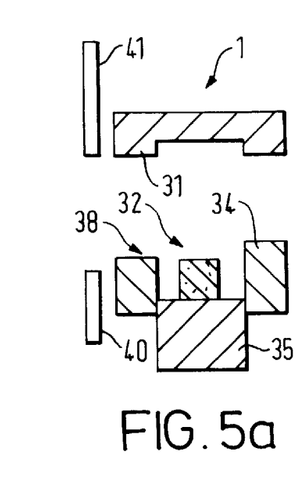
FIGS. 5a to 5j are schematic cross-sectional views showing operation of apparatus of a fifth example of the present invention.
Figures 5B, 5G:
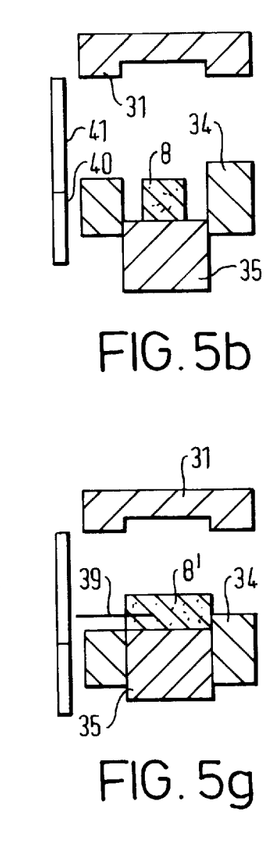
Figures 5C, 5H:
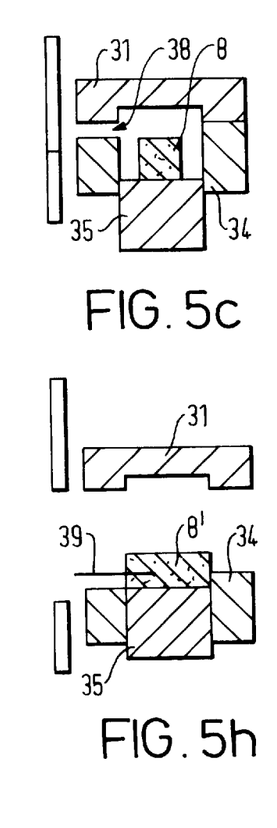
Figures 5D, 5I:
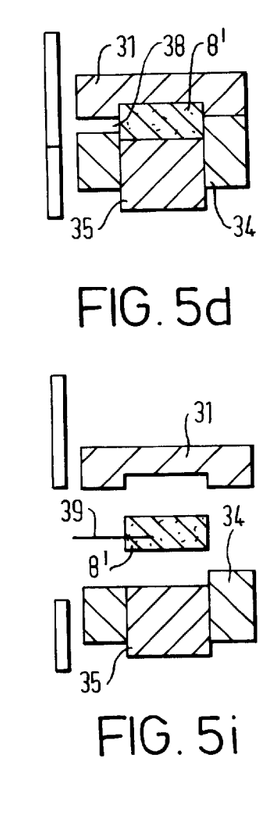
Figures 5E, 5J:
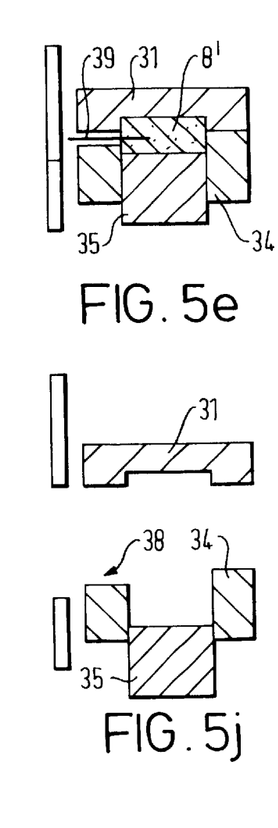
Figure 5F:
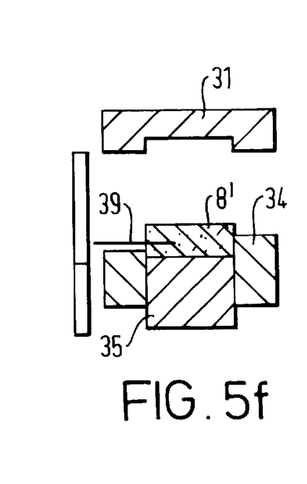

Guard plates 40,41 can be provided so as to prevent injury to an operator from occurring. The guard plates 40,41 open and close as appropriate during the moulding process.

It will be appreciated that a liquid nitrogen bath 23 could be used in the example of FIG. 4 instead of spraying the rear surfaces of the mould 30 with liquid nitrogen.

As a further variant to the examples described above, the temperature of the mould 6,30 or moulding stamp 20 can be maintained by passing liquid nitrogen through appropriate cooling channels in the mould 6,30 or stamp 20, the temperature of the liquid nitrogen being maintained constant by use of a heat exchanger associated with the apparatus 1.

Figure 6:
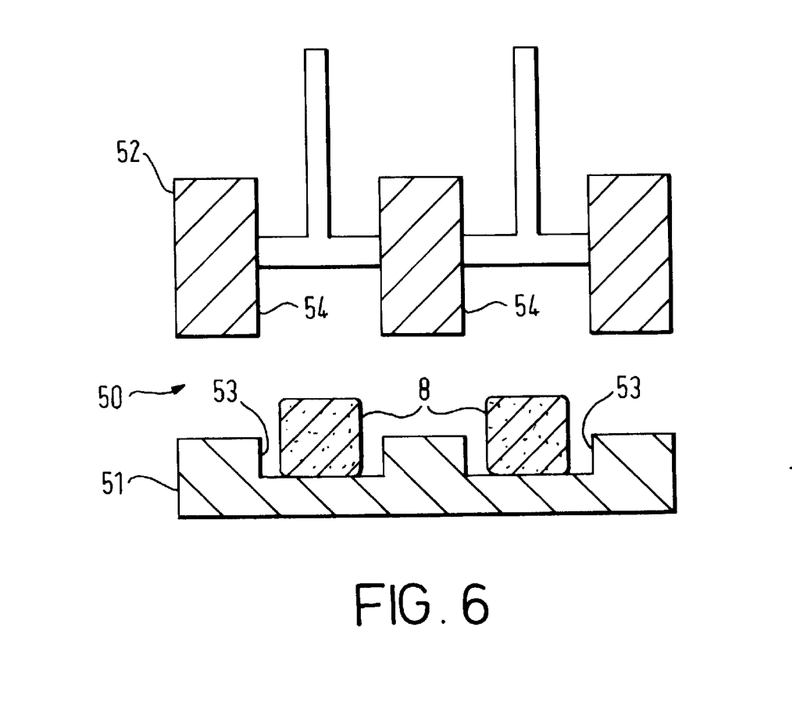
FIG. 6 is a schematic cross-sectional view of an example of apparatus for and according to the present invention.

In the example shown in FIG. 6, a mould 50 has a lower moulding plate 51 and an upper moulding plate 52. Each of the lower and upper moulding plates 51,52 has two moulding cavities 53,54 which respectively define the final shape of the moulded food product 8.

Figure 8:
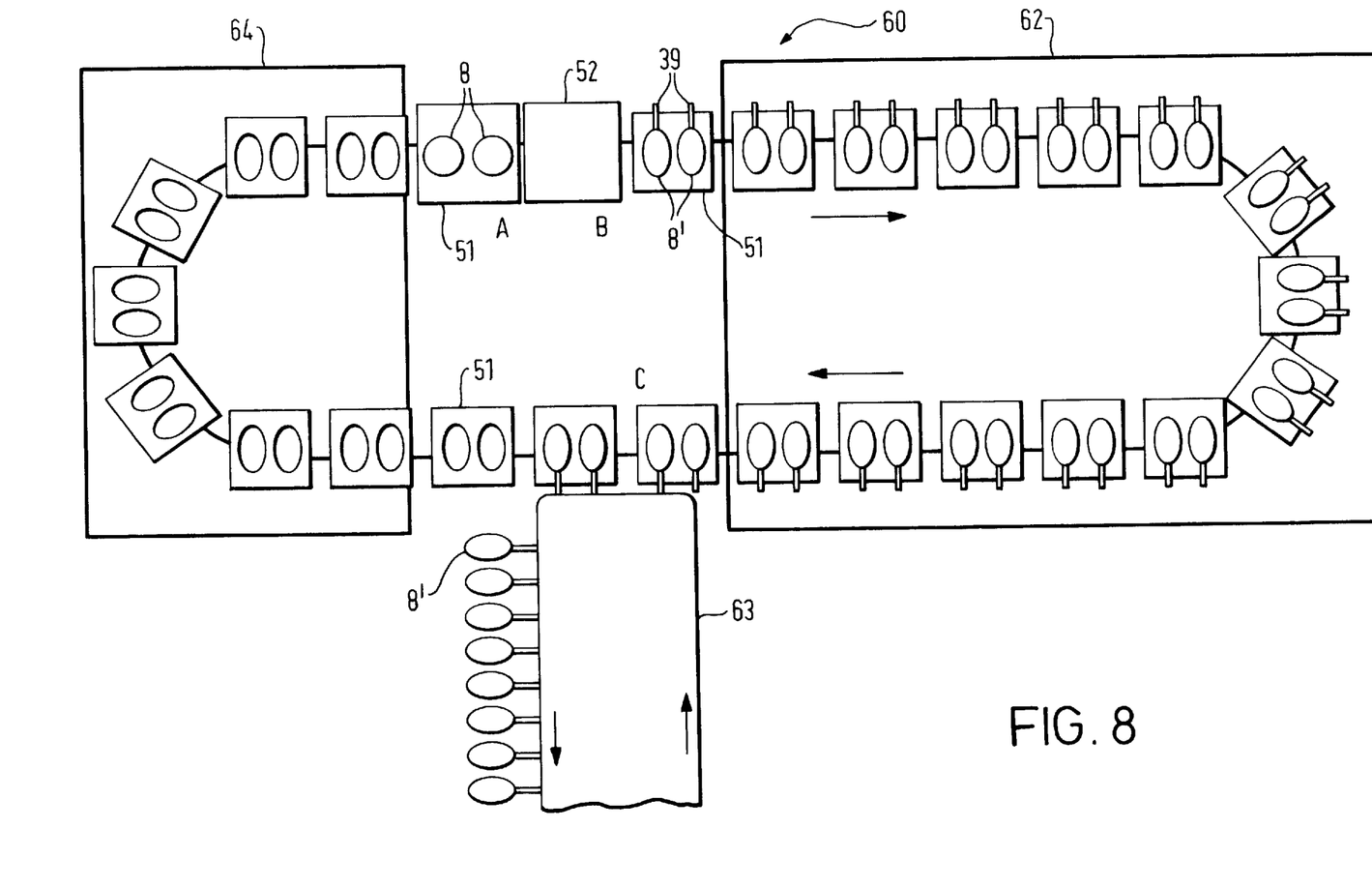

In FIG. 8, there is shown schematically a plan view of a system 60 in which the moulding apparatus of any of the examples of the present invention may be used. The system 60 will be described with particular reference to the example of the apparatus 50 shown in FIG. 6.

Figure 7:
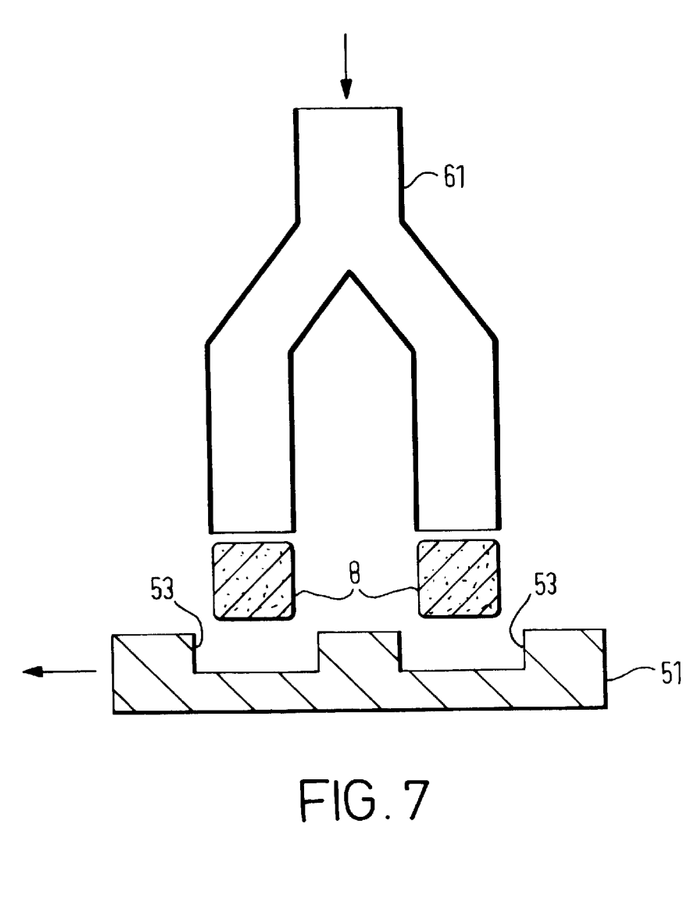
FIG. 7 is a schematic cross-sectional view of a lower mould part of the example of FIG. 5 being loaded with portions of a food product; and, FIG. 8 is a schematic plan view of a system in which apparatus of the present invention may be used.

With reference to FIG. 8, at position A (also shown in FIG. 7), a vertical extruder 61 deposits a portion of the food product (e.g. ice cream) 8 in a non-fluid state into each of the cavities 53 of the lower mould plate 51. The portions 8 are cut with a wire cutter (not shown) associated with the extruder 61.

The lower mould plate 51 is then moved to position B in FIG. 8 where the lower mould plate 51 is moved upwards to meet the upper mould plate 52, thereby to forge or mould the portions of food product 8 on the lower mould plate 51 to take up the shape of the cavities 53, 54 in the mould plates 51,52. The temperatures of the mould plates 51,52 are maintained low enough to keep the portions of product 8 in a non-fluid state.

After the portions of product 8 have been moulded, the lower mould plate 51 containing the moulded portions of product 8' is lowered and moved to a cooling chamber 62. The lower mould plate 51 containing the moulded portions of product 8' is moved through the cooling chamber 62 so that the food products 8' can be hardened by cooling.

On exiting the cooling chamber 62, the hardened (cooled or frozen) moulded food products 8 are removed at position C from the lower mould plate 51 by a suitable machine 63 which is known in itself and which will not be further described. In the example shown, the food products 8 are ice cream and a wooden stick 39 is inserted immediately the mould plates 51,52 are brought together so as to produce an ice cream stick confection. The removal machine 63 can remove the ice cream stick confection from the lower mould plate 51 by gripping the wooden stick 39.

The removed moulded food products 8 can then be transported away by the removal machine 63 for further processing and packaging in known manner.

After the moulded food products 8' have been removed, the lower mould plate 51 is moved to a thermal recovery chamber 64 where the plate 51 is re-cooled to the preferred temperature. The mould plate 51 is then returned to position A to receive new portions of food product 8. The temperature of the mould plate 51 at position A is preferably less than −40° C., more preferably less than −50° C., and more preferably less than −75° C. The temperature of the lower mould plate 51 is most preferably −80° C. or lower.

It will be appreciated that the system 60 can operate on a substantially continuous automatic basis with batches of food products 8 being received, moulded, cooled and removed in turn. In a specific example, sixty portions of food product 8 can be moulded per minute with the system 60 of FIG. 8.

For an ice cream product, as mentioned above, the preferred temperature of the product during moulding is about −5° C. or −6° C. However, a temperature for the product of up to about −3° C. may be used. It is important that the viscosity be low enough (i.e. the product must be at a sufficiently high temperature) for the moulding machine to be able to mould the product and for the moulded product to retain its shape. However, at too high a temperature, air in the ice cream may be lost during moulding, probably because the ice cream acts more like a fluid, and thus the product may not fill the mould completely.

Where the final moulded product has a thin cross-sectional shape, at least in part, then it is important for the pre-moulded product (the product "blank") to have a uniform shape and to extend over the area of the mould chamber. If the product blank does not extend over the area of the mould chamber, then the product cannot squeeze along any thin channels in the mould, especially as the cross-sectional area of any thin channels reduces rapidly as layers of the product harden in the thin channels during moulding.

In each of the examples shown in FIGS. 4, 5, 6 and 7, particularly where the product is ice cream, it has been found that the temperature of the bottom mould part is preferably held at −120° C. whilst the temperature of the upper mould part is preferably held in the range −100° C. to −80° C. A low temperature is used in order to produce rapid cooling of the surface of the ice cream product. A limiting factor is the thermal contraction of the product and the shape to be moulded. For example, where the moulded product has deep recesses or raised parts that are widely spaced, as the product contracts thermally, these elements can grip the face of the mould. This is especially so where the product is in contact with the mould part for longer than about 2 seconds. In such a case, the higher temperature of −80° C. for the mould part in contact with the surface having the sharp edges is preferred and may alleviate the problem of the product sticking to the mould.

In each of the examples described above, the moulding pressure felt by the product during moulding may be as high as 21 psi (approximately 1.5 bar). However, use of such high moulding pressures requires the volume of the product blank to be within close limits, e.g. within ±2%. For ice cream, if the volume of the product blank is too great, then, because ice cream contains in the region of 50% air, the ice cream is compressed during moulding; when the mould is released, the ice cream expands again and the outer hardened layer cracks, usually along the mould joint line. If the volume of the product blank is too small, then the mould is not filled. It has been found that if a moulding pressure as felt by the product (i.e. the force per unit surface area of the product) of about 8 psi±2 psi (about 0.5 bar±0.15 bar) is used, then cracking due to compression and re-expansion of the product can largely be avoided with the mould still being filled and the system and method of the invention is not so sensitive to variations in the volume of the product blank placed in the mould. Generally speaking, it has also been found that thicker products are less prone to compression/expansion cracking than thinner products.

A cooling chamber, like the cooling chamber 62 described above and shown in the drawings, may be used with any of the examples of the invention described above to achieve further cooling or freezing of the product after the product has been moulded.

Such cooling chambers, which are typically air blast spiral or tunnel freezers, are, however, expensive for manufacturers to purchase and maintain and are also very bulky and present a barrier to small manufacturers in particular to entry to the relevant market. In order to avoid the need for a cooling chamber, it is possible to introduce cryogenic pellets into the product prior to the moulding step. Such a technique is disclosed in U.S. Pat. No. 3,360,384, the entire disclosure of which is incorporated herein by reference. The temperature of the pellets and the mixing ratio of pellets to the product may be selected such that, after mixing the pellets into the product, the product equilibrates to the desired temperature formerly achieved in the hardening step. In this fashion, the need for a separate hardening step is completely eliminated.

The cryogenic pellets may be obtained by removing a portion (for example 25%) of the product prior to the moulding step, cooling said portion to a cryogenic temperature, and pelletising said portion into the cryogenic pellets. Alternatively, novelty products may be created by mixing pellets of a different ingredient or recipe into he main bulk product, in a similar manner to solid ingredients such as nuts or chocolate being whisked into ices. Combination ice creams/fruit ice sorbet products could be produced that self harden in this way.

The cryogenic pellets can then be re-introduced into the remainder of the product just before the product is moulded. There is then typically a period of between about 10 to 30 seconds before the product hardens due to equalisation of the temperature throughout the product and during which the product must be moulded as described above.

As the name "cryogenic pellets" implies, the pellets which are mixed into the product are at a cryogenic temperature which is defined herein for this purpose as −80° C. or lower. Calculations are performed to determine the pellet temperature and mixing ratio which are necessary to have the product equilibrate to the desired temperature. A pellet temperature of −196° C. may be used because it is the temperature of liquid nitrogen which is a convenient refrigeration source for cooling the pellet material.

The actual pellet production can be performed by a number of conventional methods such as those taught in U.S. Pat No. 3,647,478, U.S. Pat. No. 4,761,962 and U.S. Pat. No. 5,199,269. The size and shape of the pellets produced is important. The pellets should be suitable for rapid and even mixing into the warmer product to create a homogeneous slurry. The pellets should remain individual and should not stick or clump together in hold-up tanks or pipelines. Production of the pellets should ensure even and consistent individual quick frozen quality. For this reason, cryogenic production of the pellets is referred, for example utilizing a cryogenic drum freezer as taught in U.S. Pat. No. 4,914,927 or drop dispenser into a liquid cryogen. Low adhesion phenomena exhibited at cryogenic temperatures ensures that the beads remain separate. Equipment surfaces operating at cryogenic temperatures up to the mixing point ensure that the beads do not stick and clog.

Mixing of the pellets into the product may be carried out as a batch process, with a suitable mixer in a batch tank, or as a continuous process where the mixer includes a solid ingredient feeder.

Whilst it is envisaged that the use of cryogenic pellets described above will avoid the need for a cooling chamber to cool the product after moulding, such as chamber may be used in addition to cryogenic pellets if desired.

An embodiment of the present invention has been described with particular reference to the examples illustrated. However, it will be appreciated that variations and modifications may be made to the examples described within the scope of the present invention.

What is claimed is:

1. A method of moulding a food product, the method comprising the steps of:
   lowering the temperature of a food product so that the food product is plastic; and,
   pressing a mould against the food product to cause at least a portion of the food product to take up the shape of the mould, the mould being at a sufficiently low temperature of −80° C. or less such that when the mould is pressed against the food products, the food product retains its moulded shape and the food product is readily releasable from the mould.

2. The method of claim 1, wherein the food product is a confectionery product.

3. The method of claim 2, wherein the confectionery product is ice cream.

4. The method of claim 3, wherein the temperature of the ice cream is lowered to −3° C. or lower, prior to placing the mould against the ice cream.

5. The method of claim 4, wherein the temperature of the ice cream is lowered to −20° C. prior to placing the mould against the ice cream.

6. The method of claim 2, wherein the confectionery product is a sorbet.

7. The method of claim 1, wherein the food product is a meat product.

8. The method of claim 1, wherein the moulding step impresses a pattern in a surface of the food product.

9. The method of claim 1, wherein the moulding step moulds the bulk shape of the food product.

10. The method of claim 1, wherein the temperature of the mould is such that the temperature of the food product remains below 0° C. during the pressing step.

11. The method of claim 1, wherein the temperature of at least a part of the mould is held at −120° C. and the temperature of at least another part of the mould is held in the range −100° C. to −80° C.

12. The method of claim 11, wherein the mould comprises upper and lower mould parts, the food product being supported in use on the lower mould part, including the step of holding the temperature of the lower mould part at −120° C. and holding the temperature of the upper mould part in the range −100° C. to −80° C.

13. The method of claim 1, wherein a pressure of 0.5 bar at the product surface is applied to the food product during the moulding step.

14. The method of claim 1, wherein the temperature of the mould is maintained using liquid nitrogen.

15. The method of claim 14, wherein the temperature of the mould is maintained by spraying a rear non-moulding surface of the mould with liquid nitrogen.

16. The method of claim 14, wherein the temperature of the mould is maintained by immersing a rear non-moulding surface of the mould with liquid nitrogen.

17. The method of claim 14, wherein the mould has through channels through which liquid nitrogen is passed.

18. The method of claim 1, wherein the food product is in contact with the mould for 5 seconds.

19. The method of claim 1, wherein the food product is in contact with the mould for 0.5 seconds.

20. The method of claim 1, comprising the step of introducing cryogenic pellets into the food product prior to the moulding step to cause the food product to harden after the moulding step.

21. The method of claim 20, comprising the steps of removing a portion of the food product prior to the moulding step, cooling said portion to a cryogenic temperature, and pelletising said portion to form said cryogenic pellets.

22. The method of claim 1, comprising the step of cooling the food product in a separate cooling station after moulding.

23. Apparatus for moulding a food product, the apparatus comprising:

means for lowering the temperature of a food product so that the product is plastic;

a mould; and, pressing and cooling means for pressing the mould against the food product to cause at least a portion of the food product to take up the shape of the mould and for maintaining the mould at a sufficiently low temperature of −80° C. or less such that when the mould is pressed against the food product, the food product retains its moulded shape and the food product is readily releasable from the mould.

24. The apparatus of claim 23, wherein the cooling means is operable to maintain the temperature of the mould such that the temperature of the food product remains below 0° C.

25. The apparatus of claim 23, including means for maintaining the temperature of at least a part of the mould at −120° C. and the temperature of at least another part of the mould in the range −100° C. to −80° C.

26. The apparatus of claim 25, wherein the mould comprises upper and lower mould parts, the food product being supported in use on the lower mould part, and including means for maintaining the temperature of the lower mould part at −120° C. and the temperature of the upper mould part in the range −100° C. to −80° C.

27. The apparatus of claim 23, wherein the cooling means comprises means for spraying a rear non-moulding surface of the mould with liquid nitrogen.

28. The apparatus of claim 23, wherein the cooling means comprises means for immersing a rear non-moulding surface of the mould with liquid nitrogen.

29. The apparatus of claim 23, wherein the mould has through channels for passage therethrough of liquid nitrogen.

30. The apparatus of claim 23, wherein the mould has a first moulding part and a second moulding part, the first moulding part being movable relatively to the second moulding part so as to selectively open and close the mould.

31. The apparatus of claim 30, wherein the second moulding part comprises a mould cylinder and a moulding piston contained within and movable relatively to the mould cylinder such that the mould may be closed by bringing the first moulding part into contact with the mould cylinder of the second moulding part, the moulding piston of the second moulding part being movable towards the first moulding part to mould the food product within the mould.

* * * * *